US010240802B2

(12) United States Patent
Gonia et al.

(10) Patent No.: US 10,240,802 B2
(45) Date of Patent: Mar. 26, 2019

(54) HVAC CONTROL SYSTEM WITH USER INTERFACE PROVIDED BY A MOBILE WIRELESS DEVICE

(71) Applicant: Ademco Inc., Golden Valley, MN (US)

(72) Inventors: Patrick Gonia, Maplewood, MN (US); Robert D. Juntunen, Minnetonka, MN (US)

(73) Assignee: Ademco Inc., Golden Valley, MN (US)

( * ) Notice: Subject to any disclaimer, the term of this patent is extended or adjusted under 35 U.S.C. 154(b) by 89 days.

(21) Appl. No.: 15/179,553

(22) Filed: Jun. 10, 2016

(65) Prior Publication Data
US 2017/0356669 A1    Dec. 14, 2017

(51) Int. Cl.
| F24D 19/10 | (2006.01) |
| F24F 11/62 | (2018.01) |
| F24F 5/00 | (2006.01) |
| F24F 11/30 | (2018.01) |
| F24F 110/10 | (2018.01) |
| F24F 110/12 | (2018.01) |
| F24F 110/50 | (2018.01) |

(Continued)

(52) U.S. Cl.
CPC ........ F24D 19/1084 (2013.01); F24F 5/0096 (2013.01); F24F 11/30 (2018.01); F24F 11/62 (2018.01); *F24F 11/56* (2018.01); *F24F 2110/10* (2018.01); *F24F 2110/12* (2018.01); *F24F 2110/50* (2018.01); *F24F 2140/40* (2018.01); *F24F 2221/34* (2013.01)

(58) Field of Classification Search
CPC .... F24F 11/0012; F24F 5/0096; F24F 11/006; F24F 11/0017; F24D 19/1084
See application file for complete search history.

(56) References Cited

U.S. PATENT DOCUMENTS

| 4,829,779 A | 5/1989 | Munson et al. |
| 5,590,642 A * | 1/1997 | Borgeson .............. F24H 9/2085 |
| | | 126/110 R |
| 5,801,940 A | 9/1998 | Russ et al. |

(Continued)

FOREIGN PATENT DOCUMENTS

JP    2008302790 A  * 12/2008

OTHER PUBLICATIONS

Kida, Air Conditioner, Dec. 18, 2008, JP2008302790A, Whole Document.*

(Continued)

*Primary Examiner* — Larry Furdge
(74) *Attorney, Agent, or Firm* — Shumaker & Sieffert, P.A.

(57) ABSTRACT

An HVAC controller may wirelessly communicate with a mobile wireless device that provides a user interface for interacting with the HVAC controller. In some cases, the communication module wirelessly receives a sensed parameter from a remote wireless sensor in a living space of the building and receives a wired input from a return air sensor. A controller may be operatively coupled to the communication module and may control the HVAC system based at least in part on the sensed parameter from the remote wireless sensor when the sensed parameter from the remote wireless sensor is available and, in some cases, control the HVAC system based at least in part on the return air parameter when the sensed parameter from the remote wireless sensor is not available.

19 Claims, 6 Drawing Sheets

(51) Int. Cl.
*F24F 140/40* (2018.01)
*F24F 11/56* (2018.01)

(56) References Cited

U.S. PATENT DOCUMENTS

| | | | |
|---|---|---|---|
| 6,109,531 A * | 8/2000 | Hollis | F24D 19/1084 165/205 |
| 6,619,055 B1 | 9/2003 | Addy | |
| 6,622,925 B2 | 9/2003 | Carner et al. | |
| 7,133,748 B2 | 11/2006 | Robinson | |
| 7,574,283 B2 | 8/2009 | Wang et al. | |
| 7,992,794 B2 | 8/2011 | Leen et al. | |
| 8,740,101 B2 | 6/2014 | Leen et al. | |
| 2003/0040279 A1 | 2/2003 | Ballweg | |
| 2003/0066897 A1 | 4/2003 | Carner et al. | |
| 2005/0150650 A1 * | 7/2005 | Helt | F24D 12/02 165/240 |
| 2006/0112700 A1 | 6/2006 | Choi et al. | |
| 2007/0119961 A1 | 5/2007 | Kaiser | |
| 2007/0182594 A1 | 8/2007 | Face et al. | |
| 2007/0241203 A1 | 10/2007 | Wagner et al. | |
| 2007/0290924 A1 | 12/2007 | McCoy | |
| 2010/0006660 A1 * | 1/2010 | Leen | G05D 23/1931 236/51 |
| 2012/0248207 A1 | 10/2012 | Drake et al. | |
| 2013/0213952 A1 | 8/2013 | Boutin et al. | |
| 2013/0297078 A1 | 11/2013 | Kolavennu | |
| 2014/0135998 A1 | 5/2014 | Cao et al. | |
| 2014/0149270 A1 | 5/2014 | Lombard et al. | |
| 2014/0188287 A1 | 7/2014 | Sabata | |
| 2014/0217186 A1 | 8/2014 | Kramer et al. | |
| 2014/0358294 A1 * | 12/2014 | Nichols | G05D 23/1919 700/278 |

OTHER PUBLICATIONS

Invitation to Pay Additional Fees and, Where Applicable Protest Fee, in PCT Application No. PCT/US2017/036173 dated Sep. 21, 2017.

The International Search Report & Written Opinion, in PCT Application No. PCT/US2017/036173 dated Nov. 14, 2017.

Honeywell, "Connected Solutions, Comfort Made Simple," 2 pages, 2016.

Honeywell, "Equipment Interface Module," Installation Guide, 48 pages, Nov. 2012.

Honeywell, "ERM522OR Equipment Remote Module with RedLink Wireless Technology," Install Guide, 60 pages, Nov. 2015.

Honeywell, "RedLink Zoning Options, With IAQ Control From Zone 1 Stat," 6 pages, Jan. 2014.

\* cited by examiner

HVAC CONTROL SYSTEM WITH USER INTERFACE PROVIDED BY A MOBILE WIRELESS DEVICE

TECHNICAL FIELD

The present disclosure relates to Heating, Ventilation, and/or Air Conditioning (HVAC) systems, and more particularly to HVAC systems with remote user interfaces.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In many cases, the HVAC controller is mounted within the building and provides control signals to various HVAC components of the HVAC system. Improvements in the hardware, user experience, and functionality of such HVAC controllers would be desirable.

SUMMARY

This disclosure relates to Heating, Ventilation, and/or Air Conditioning (HVAC) systems, and more particularly to HVAC systems with remote user interfaces. In a particular example, an HVAC controller may be used to control an HVAC system of a building including a supply air duct and a return air duct. In some cases, the HVAC controller may include a communication module for wirelessly communicating with a mobile wireless device that provides a user interface for interacting with the HVAC controller. In some cases, the communication module wirelessly receives a sensed parameter such as a temperature from a remote wireless sensor in a living space of the building. The HVAC controller may include a wired input for receiving a signal from a return air sensor that is capable of sensing a return air parameter such as temperature of the air passing through the return air duct of the HVAC system. A controller may be operatively coupled to the communication module and may be configured to control the HVAC system based at least in part on the sensed parameter from the remote wireless sensor when the sensed parameter from the remote wireless sensor is available and, in some cases, control the HVAC system based at least in part on the return air parameter when the sensed parameter from the remote wireless sensor is not available.

Another example includes a forced air furnace that includes a furnace housing and a burner that is situated within the furnace housing. A heat exchanger may be situated inside of the furnace housing and may be thermally coupled to the burner. A blower may be situated inside of the furnace housing for providing air across the heat exchanger. A gas valve may provide gas to the burner. A controller may be situated inside of the furnace housing and operatively coupled to the gas valve and the blower. The controller may include an input for receiving a temperature value from a remote temperature sensor. The controller may also be configured to control the gas valve and the blower based at least in part on the received temperature value and a stored temperature setpoint.

In some cases, the forced air furnace may include a return air duct for receiving air from a living space of a building and a supply duct for providing conditioned air to the living space of the building. The remote temperature sensor may be located in a living space of the building serviced by the forced air furnace. In some cases, the input of the controller may be configured to receive a temperature sensor value from the remote temperature sensor that is for detecting a measure related to temperature of the air in the living space. In some cases, the controller may be configured to control the gas valve and the blower based at least in part on the received temperature value unless the received temperature sensor value is unavailable, and if the received temperature sensor value is unavailable, the controller may be configured to control the gas valve and the blower based at least in part on the temperature value received from a return air temperature sensor.

In another example of the disclosure, an HVAC controller may be used to control an HVAC system of a building including a supply air duct and a return air duct. In some cases, the HVAC controller may include a communication module for wirelessly receiving a sensed temperature from a remote wireless sensor located in a living space of the building as well as receiving a sensed temperature from a return air sensor configured to detect a return air temperature of the air in the return air duct over a wired connection. A controller may be operatively coupled to the communication module and may be configured to control the HVAC system based at least in part on the sensed temperature from the remote wireless sensor when the sensed temperature from the remote wireless sensor is available and to control the HVAC system based at least in part on the return air temperature when the sensed temperature from the remote wireless sensor is not available. In some cases, the communication module is also configured to communicate with a smart phone for provision of a graphical user interface for configuration of the controller. The graphical user interface may have, for example, ability to adjust the temperature setpoint for one or more areas of the building or to adjust a setpoint schedule. In some cases, the communications module may also be configured to receive a temperature measurement from the smart phone. In some cases, the HVAC controller is also configured to provide a local user interface located near the HVAC system (e.g. mounted to the return air duct, furnace housing or air supply plenum, or a wall nearby) for changing a setpoint of the controller. The local user interface may be used to change the setpoint when, for example, the smart phone-based user interface is not available.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

Figure 1:
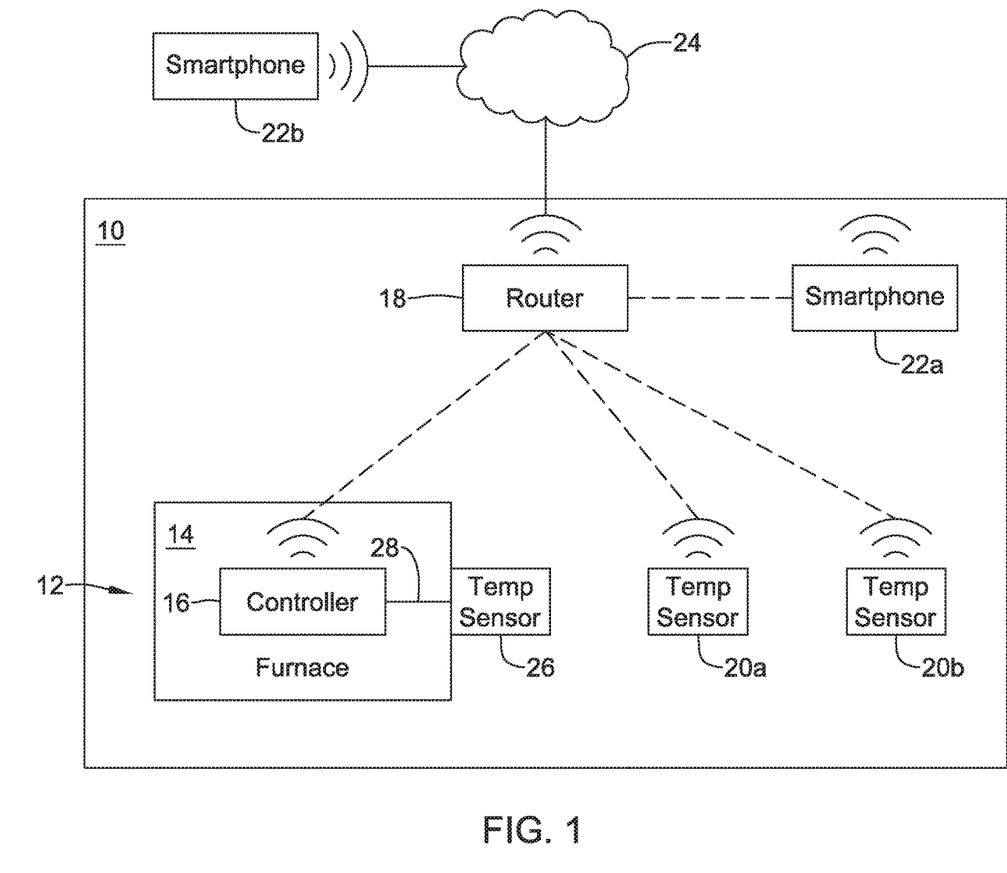
FIG. 1 is a schematic view of an illustrative HVAC system servicing a building or structure.

FIG. 1 is a schematic view of a building 10 having an illustrative Heating, Ventilation, and/or Air Conditioning (HVAC) system 12. While FIG. 1 shows the HVAC system 12 as being a forced air furnace 14, it will be appreciated that other types of HVAC systems are contemplated including, but not limited to, boiler systems, radiant heating systems, electric heating systems, cooling systems, heat pump systems, and/or any other suitable type of HVAC system, as desired. The illustrative HVAC system 12 of FIG. 1 may include additional components, including but not limited to ductwork and air vents, as will be described with respect to subsequent Figures. Examples of additional components may also include one or more of a heat pump, an electric heat pump, a geothermal heat pump, an electric heating unit, an air conditioning unit, a humidifier, a dehumidifier, an air exchanger, an air cleaner, a damper, a valve, and/or the like.

The furnace 14 includes a furnace controller 16 that may be configured to operate the furnace 14 (or other manifestations of the HVAC system 12). Instead of being in wired or wireless communication with an HVAC controller such as a thermostat, the furnace controller 16 may instead communicate wirelessly with, for example, a router 18 that is positioned somewhere within the building 10. The furnace controller 16 may communicate with the router 18 using any wireless communication protocols including, but not limited to, Wi-Fi, IrDA, IEEE 802.15.4, ZigBee, Bluetooth, dedicated short range communication (DSRC), EnOcean, and GSM or LTE cellular communication and/or any other suitable common or proprietary wireless protocol, as desired.

In some cases, the functions of a traditional thermostat may be divided out into distinct components. In some cases, for example, the building 10 may include one or more temperature sensors that may be spaced about the building 10 and that may communicate wirelessly with the router 18 and thus with the furnace controller 16 within the furnace 14. As illustrated, the building 10 may include a first temperature sensor 20a and a second temperature sensor 20b. In some cases, there may only be a single temperature sensor within the building 10. In some cases, there may be three, four or more distinct temperature sensors within the building 10, each sensing local temperatures and communicating the same to the furnace controller 16 via the router 18. The temperature sensors 20a, 20b may communicate with the router 18 via any wireless communication protocols including, but not limited to, Wi-Fi, IrDA, IEEE 802.15.4, ZigBee, Bluetooth, dedicated short range communication (DSRC), EnOcean, and GSM or LTE cellular communication and/or any other suitable common or proprietary wireless protocol, as desired. In some cases, the temperature sensors 20a, 20b may communicate directly with the furnace controller 16 without a need for the router 18 via any suitable wireless communication protocol including, but not limited to, Wi-Fi, IrDA, IEEE 802.15.4, ZigBee, Bluetooth, dedicated short range communication (DSRC), EnOcean, and GSM or LTE cellular communication and/or any other suitable common or proprietary wireless protocol, as desired.

In some cases, a smartphone may be used to provide a user interface, as will be shown subsequently with respect to FIG. 4. As illustrated, there is a first smartphone 22a shown within the building 10, communicating wirelessly with the router 18, as well as a second smartphone 22b, which is remote from the building 10 and which communicates via a cellular network 24. It will be appreciated that there is no requirement for two smartphones. Rather, this is intended to indicate that a user may utilize a user interface displayable on their smartphone regardless of whether the user is inside the building 10, as represented by the first smartphone 22a, or remote from the building 10, as represented by the second smartphone 22b. A person at home within the building 10 may use their smartphone 22a to raise or lower a temperature setpoint, for example. A person at work, away from the building 10, may use their smartphone 22b to change a temperature setpoint to an away temperature setpoint, or to turn equipment on or off, for example.

In some cases, the first smartphone 22a may communicate directly with the furnace controller 16 (e.g. not through an intervening router 18) via any suitable wireless communication protocol including, but not limited to, Wi-Fi, IrDA, IEEE 802.15.4, ZigBee, Bluetooth, dedicated short range communication (DSRC), EnOcean, and GSM or LTE cellular communication and/or any other suitable common or proprietary wireless protocol, as desired.

It is contemplated that the furnace controller 16 may be configured to control the comfort level in the building or structure by activating and deactivating the HVAC system 12 in a controlled manner. In some cases, the furnace controller 16 may include a schedule of time periods and temperature setpoints to be used for each time period. In some instances, this scheduling information may be entered using a smartphone such as the first smartphone 22a or the second smartphone 22b.

In some cases, the HVAC system 12 may include a temperature sensor 26 that can be located near the HVAC system 12. In some instances, the temperature sensor 26 is located in a return air duct in order to provide an indication of a current air temperature within the building 10. In some instances, in order to provide temperature information to the furnace controller 16 in the event that communication is lost between the furnace controller 16 and the temperature sensors 20a, 20b, the temperature sensor 26 may be connected to the furnace controller 16 via a wired connection 28.

While FIG. 1 generally indicates a first smartphone 22a and a second smartphone 22b, it will be appreciated that remote access and/or control of the furnace controller 16 may be provided via a variety of remote wireless devices including, but not limited to, mobile phones including smart phones, tablet computers, laptop or personal computers, smart watches, wireless network-enabled key fobs, e-readers, and/or the like.

In some cases, an application program code (i.e. app) stored in the memory of the first smartphone 22a and/or the second smartphone 22b may be used to remotely access and/or control the furnace controller 16. The application program code (app) may be downloaded from an external web service, such as a web service hosted by an external web server (e.g. Honeywell's TOTAL CONNECT™ web service) or another external web service (e.g. ITUNES® or Google Play). In some cases, the app may provide a remote user interface for interacting with the furnace controller 16 at the first smartphone 22a and/or the second smartphone 22b. For example, through the user interface provided by the app, a user may be able to change operating parameter settings such as, for example, temperature set points for one or more areas of the building, humidity set points, start times, end times, schedules, window frost protection settings, accept software updates and/or the like.

Figure 2:
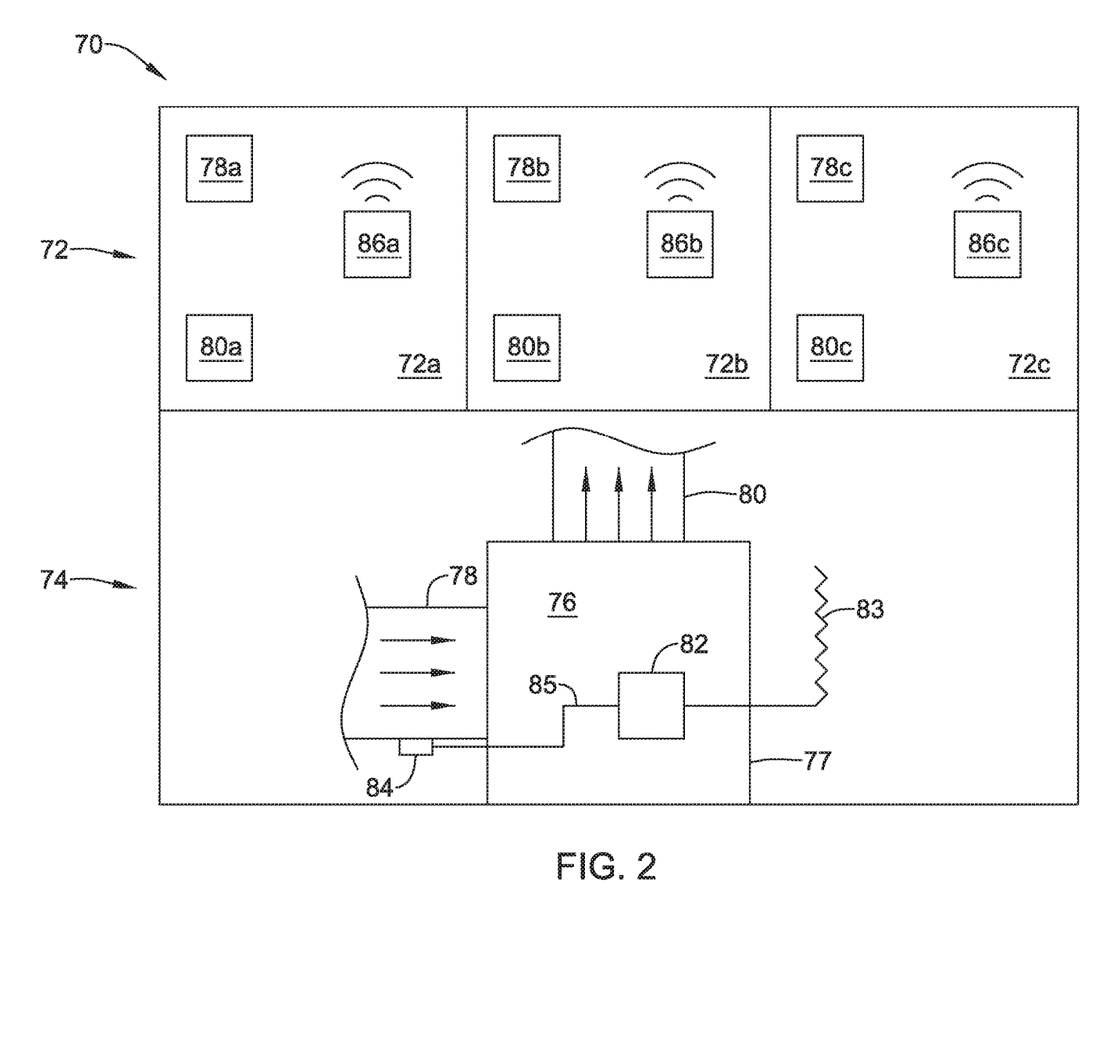
FIG. 2 is a schematic view of a building including an illustrative HVAC control system.

FIG. 2 provides a schematic view of a building space 70 that may be considered as being within the building 10 (FIG. 1), or otherwise be an example of the building 10. As shown, the illustrative building space 70 has an upper floor 72 and a lower floor 74. In some cases, the upper floor 72 may be, as illustrated, divided into individual rooms 72a, 72b, 72c, but this is not required in all cases. In some cases, the upper floor 72 may be divided into a greater number of distinct spaces. In some cases, the upper floor 72 may be divided into a lesser number of distinct spaces, or may in fact be a unitary space. In some instances, the lower floor 74 may be considered a basement. In the example shown, the basement houses a forced air furnace 76 that may, for example, be considered as being an example of the HVAC system 12 (FIG. 1). While shown as a forced air system, the forced air furnace 76 may instead be a boiler in a hot water heating system, for example.

As illustrated, the forced air furnace 76 may include a return air duct 78 and a supply air duct 80. The return air duct 78 brings air back from other spaces within the building space 70. In some cases, for example, the return air duct 78 may be in fluid communication with one or more of a return air vent 78a disposed within the room 72a, a return air vent 78b disposed within the room 72b, a return air vent 78c disposed within the room 72c, and so on. The return air duct 78 may be in fluid communication with any number of distinct return air vents. In some cases, the supply air duct 80 provides conditioned air, which may involve one or more of heating the air, cooling the air, humidifying or dehumidifying the air and/or the addition of fresh air, to the building space 70. In some instances, for example, the supply air duct 80 may be in fluid communication with one or more of a supply air vent 80a disposed within the room 72a, a supply air vent 80b disposed within the room 72b, a supply air vent 80c disposed within the room 72c, and so on. The supply air duct 80 may be in fluid communication with any number of distinct supply air vents.

The illustrative forced air furnace 76 includes a furnace control board 82 that controls operation of the forced air furnace 76. In some cases, the furnace control board 82 is configured to receive an air parameter value that is sensed by a return air sensor 84. In some instances, the return air sensor 84 is positioned on or even within the return air duct 78 so that the return air sensor 84 is able to sense or otherwise determine an air parameter of the return air. In some cases, the return air sensor 84 is hard-wired to the furnace control board 82 via a wired connection 85, but this is not required in all cases. Examples of air parameters that may be sensed or otherwise determined by the return air sensor 84 include but are not limited to air temperature, air humidity, particulate density, and volatile organic compound density. In some cases, the furnace control board 82 may be configured to also receive an air parameter value that is sensed by a remote wireless sensor that may, for example, be considered as representative of one of the temperature sensors 20a and 20b (FIG. 1).

As illustrated, there may be a first remote wireless sensor 86a disposed in the room 72a, a second remote wireless sensor 86b disposed in the room 72b and a third remote wireless sensor 86c disposed in the room 72c. In some cases, there may be fewer remote wireless sensors. In some instances, there may be a greater number of remote wireless sensors. Examples of air parameters that may be sensed or otherwise determined by the remote wireless sensors 86a, 86b, 86c include but are not limited to air temperature, air humidity, particulate density, and volatile organic compound density. In some cases, the forced air furnace 76 may include a furnace housing 77, with the furnace control board 82 located within the furnace housing 77. In some cases, the furnace housing 77 may be metal. An antenna 83 may be operatively coupled to the furnace control board 82, and in some cases may extend outside of the furnace housing 77. The antenna 83 may help transmit and/or receive wireless signals to/from, for example, the remote wireless sensors 86a, 86b, 86c, the furnace controller board 82, a wireless network host, a wireless network router or gateway, and/or any other suitable device.

Figure 3:
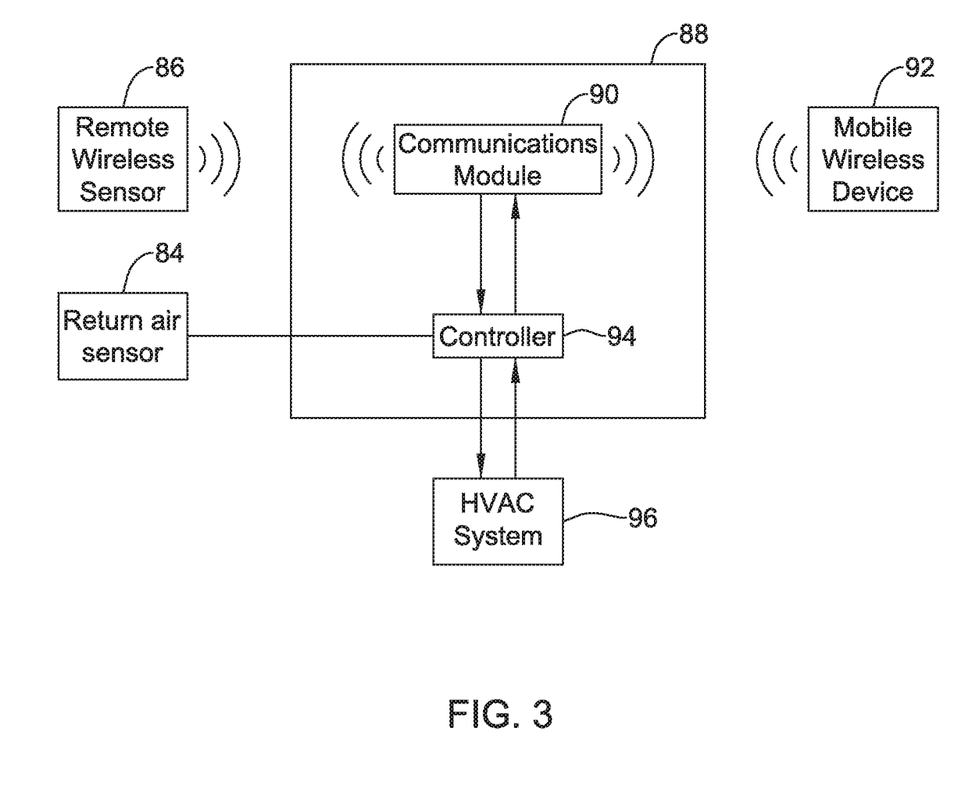
FIG. 3 is a schematic view of an illustrative HVAC controller such as that shown in FIG. 1.

FIG. 3 is a schematic illustration of an illustrative HVAC controller 88. In some cases, the HVAC controller 88 may be considered as being an example of the furnace controller 16 shown in of FIG. 1. In some cases, the HVAC controller 88 may be distinct from the furnace control board 82 (FIG. 2), while in other cases the HVAC controller 88 may be part of the furnace control board 82 and/or the functionality of the HVAC controller 88 may be manifested within the furnace control board 82.

The illustrative HVAC controller 88 includes a communication module 90 that in some cases is configured to communicate with a mobile wireless device 92. In some cases, the mobile wireless device 92 may be a smartphone or a tablet and may communicate directly with the communication module 90 using any suitable wireless communications protocol such as Wi-Fi, Bluetooth, etc. In some cases, if the mobile wireless device 92 is out of Wi-Fi (and/or Bluetooth) range of the communication module 90, the mobile wireless device 92 may instead communicate via a cellular network and reach the communication module 90 via the cellular network 24 and the router 18 (FIG. 1). In some cases, as will be referenced with respect to FIG. 4, the mobile wireless device 92 may provide a user interface that may be used to interact with the HVAC controller 88. In some cases, the communication module 90 may be configured to wirelessly receive a sensed parameter from a remote wireless sensor such as the remote wireless sensor 86 (or the remote wireless sensors 86a, 86b, 86c in FIG. 2) and provide it to a controller 94.

Figure 5:
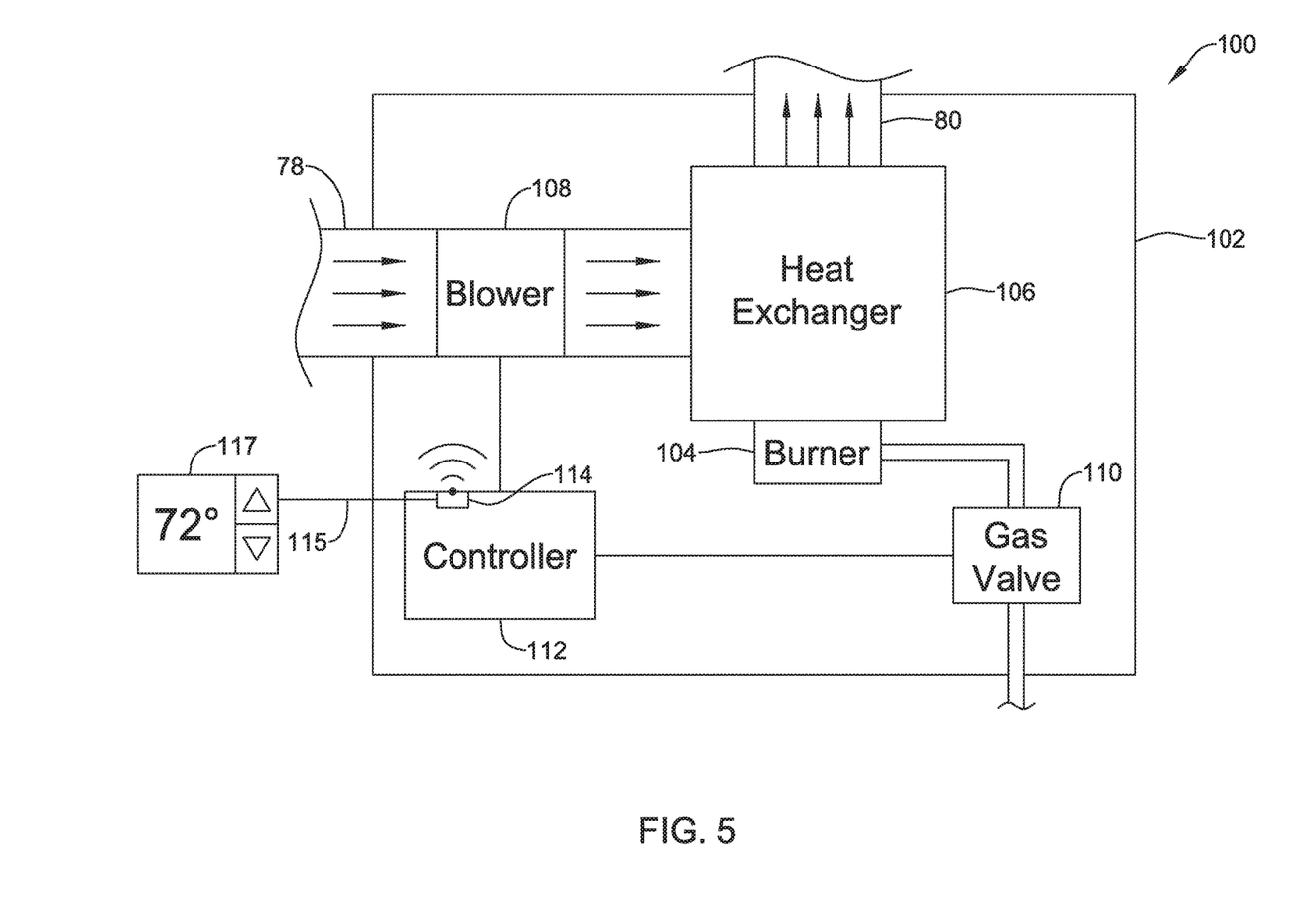
FIG. 5 is a schematic view of an illustrative forced air furnace.

The illustrative HVAC controller 88 also includes a controller 94 that is operatively coupled to the communication module 90. The controller 94 may also be configured to receive a wired input form a return air sensor such as the return air sensor 84 that is capable of sensing a return air parameter of the air passing through the return air duct 78 (FIG. 2). In some cases, the controller 94 may be configured to control an HVAC system 96 (representative of the forced air furnace 76 of FIG. 2) based at least in part on the sensed parameter from the remote wireless sensor 86a, 86b, 86c when the sensed parameter from the remote wireless sensor(s) is (are) available, and to control the HVAC system 96 based at least in part on the return air parameter when the sensed parameter from the remote wireless sensors 86a, 86b, 86c are not available. In some cases, if controlling the HVAC system 96 based at least in part on the return air parameter, the controller 94 may run the blower prior to detecting the return air parameter in order that the detected return air parameter may be more closely aligned with conditions within the building space 70 (FIG. 2). In some cases, the sensed parameter from the remote wireless sensor 86 is an air temperature and the return air parameter is also an air temperature. In some cases, the controller 94 controls the HVAC system 96 based at least in part on a setpoint such as a temperature setpoint, and a user is allowed to conveniently change the setpoint via a user interface manifested on a screen of the mobile wireless device 92. As a backup mechanism, in the event of a loss of wireless communications to the mobile wireless device 92 (such as a smart phone), a user may be allowed to change the setpoint via a local user interface (such as a local user interface 117, as shown in FIG. 5) which is proximate the controller 112 and wires to the controller 112 via a wire 115.

In some cases, the controller 94 may be configured to determine and store an offset between the sensed parameter in the building space and the return air parameter when the sensed parameter from the remote wireless sensors 86a, 86b, 86c are available, and to control the HVAC system 96 based at least in part on the return air parameter and the stored offset when the sensed parameter from the remote wireless sensors are not available. In some instances, the communication module 90 may be configured to receive a measure of outside air temperature, such as but not limited to an outdoor temperature sensor that is operably coupled with the HVAC controller 88, a temperature received from a local weather service or perhaps a temperature received from the internet based upon zip code. In some cases, the controller 94 may be configured to determine an offset function of a determined offset between the sensed parameter and the return air parameter over outdoor air temperature when the sensed parameter from the remote wireless sensors 86a, 86b, 86c are available, and to control the HVAC system 96 based at least in part on the return air parameter, the measure of outdoor air temperature and the offset function when the sensed parameter from the remote wireless sensors 86a, 86b, 86c are not available.

Figure 4:
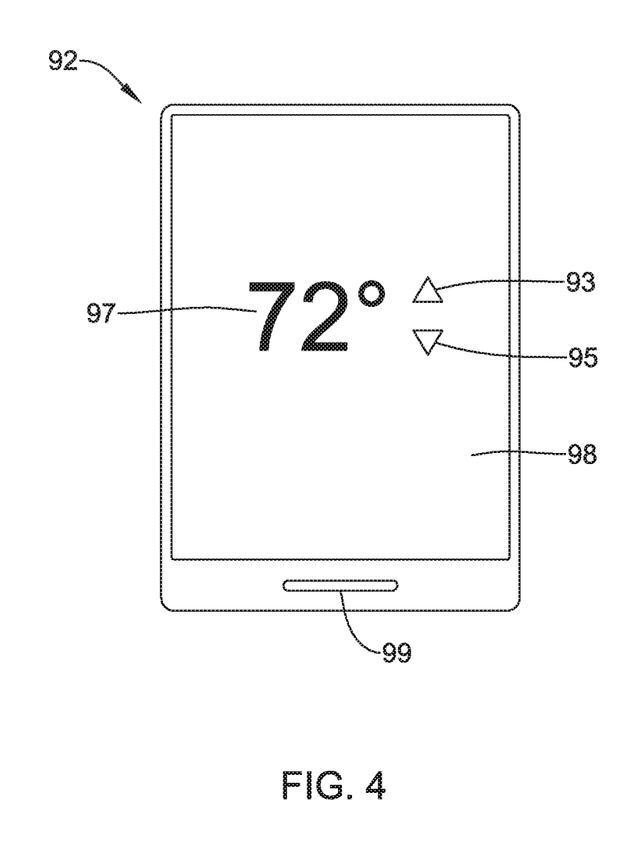
FIG. 4 is a schematic view of an illustrative user interface displayable on a mobile wireless device.

FIG. 4 shows an example of the mobile wireless device 92. As illustrated, the mobile wireless device 92 may be a smartphone, but other devices are contemplated as well. In some cases, the mobile wireless device 92 includes a touchscreen 98 and a button 99 located below the touchscreen 98. The touchscreen 98 may be configured to display a user interface that the user may use to read information displayed on the touchscreen 98 (provided by the HVAC controller 88 of FIG. 3) and/or to enter information via the touchscreen 98. As an illustrative but non-limiting example, the touchscreen 98 may be seen as displaying a temperature setpoint 97, currently set to 72 degrees, as well as an up arrow 93 and a down arrow 95. The up arrow 93 and the down arrow 95 may be used, for example, to raise or lower the displayed temperature setpoint 97. The adjusted temperature setpoint 97 may then be communicated to the HVAC controller 88. It will be appreciated that this is a simple example of what may be displayed on the user interface manifested on the touchscreen 98. In some cases, scheduling information, temperature set points, configuration information, and/or any other suitable information may be entered into or displayed via the user interface on the touchscreen 98.

In some cases, the mobile wireless device 92 may itself include a temperature sensor that may be used to help regulate operation of the HVAC system 96. In some cases, the mobile wireless device 92 may be configured to provide information as to its location within the building space 70. This information may be used, for example, to provide localized temperature control in the specific portion of the building space 70 that the person carrying the mobile wireless device 92 is currently in. In some cases, the location of a particular mobile wireless device 92 may be used to select a closest wireless temperature sensor for providing temperature control. In an HVAC system 96 that includes zoning, individual mobile wireless devices 92 may be used to help control temperature within each zone. In some cases, a zone without a mobile wireless device 92 in it may be controlled to a predetermined temperature.

FIG. 5 is a schematic illustration of an illustrative forced air furnace 100 that may, for example, be considered as representative of the forced air furnace 76 (FIG. 2) and/or as part of the HVAC system 96 (FIG. 3). The illustrative forced air furnace 100 includes a housing 102. The return air duct 78 enters the housing 102 and the supply air duct 80 exits the housing 102. The forced air furnace 100 may include a burner 104 that is situated within the housing 102. A heat exchanger 106 is situated within the housing 102 and is thermally coupled to the burner 104. In some cases, the heat exchanger 106 provides a thermal connection between the heated exhaust gases from the burner 104 and the air traveling through the furnace 100 from the return air duct 78 to the supply air duct 80. In some cases, the heated exhaust gases travel through the heat exchanger 106 on their way to an exhaust (not illustrated), thereby heating the surfaces of the heat exchanger 106. The air passing from the return air duct 78 to the supply air duct 80 travels over the heated surfaces of the heat exchanger 106 and thus the air is heated prior to exiting the forced air furnace 100 via the supply air duct 80. A blower 108 facilitates air movement across the heat exchanger 106 and through the forced air furnace 100.

In the example shown, a gas valve 110 provides a source of gas such as natural gas, propane or the like from a centralized gas source to the burner 104. The burner 104 burns the gas provided by the gas valve 110 to provide heat. In some cases, an HVAC controller 112 may be situated within the HVAC housing 102 and may be operatively coupled to the gas valve 110 and the blower 108. The HVAC controller 112 may include a communication port 114 that may be configured to receive, such as wirelessly receive, a temperature value from a remote wireless sensor, such as the remote wireless sensors 86a, 86b, 86c (FIG. 2). In some cases, the communication port 114 may be configured to wirelessly communicate with a mobile wireless device, such as the mobile wireless device 92 (FIG. 3) which may provide a user interface for interacting with the HVAC controller 112. In some cases, the communication port 114 may include an antenna (not shown). In some cases, the antenna may extend outside of the housing 102, especially when the housing is metal. In some instances, the communication port 114 may also be configured to communicate over a wired connection 115 with a wired local user interface 117. The wired local user interface 117 may be configured to allow a user to change a stored temperature setpoint. The local user interface 117 may be used to change the setpoint when, for example, the mobile wireless device 92 is not available or communications between the mobile wireless device 92 and the HVAC controller 112 is not available.

In some cases, the HVAC controller 112 may be configured to control the gas valve 110 and the blower 108 based at least in part on the received temperature value and on a stored temperature setpoint. In some cases, the HVAC controller 112 may be configured to control the gas valve 110 and the blower 108 in an attempt to keep the received temperature value within a predetermined dead band of the stored temperature setpoint. The predetermined dead band may be an installer-specified parameter, a factory-specified parameter or in some cases may be a user-specified parameter.

In some cases, the HVAC controller 112 may be configured to control the gas valve 110 and the blower 108 based at least in part on the received temperature value (such as from the remote wireless sensors 86a, 86b, 86c of FIG. 3) unless the received temperature sensor value is currently unavailable (e.g. wireless communication link is down, etc.). If the received temperature sensor value is unavailable, the HVAC controller 112 may be configured to automatically control the gas valve 110 and the blower 108 based at least in part on the temperature value received from the return air temperature sensor, such as the return air sensor 84 (FIG. 3). In some cases, the HVAC controller 112 may be distinct from a furnace control board. In some cases, the HVAC controller 112 may represent the furnace control board or may be manifested on the furnace control board.

Figure 6:
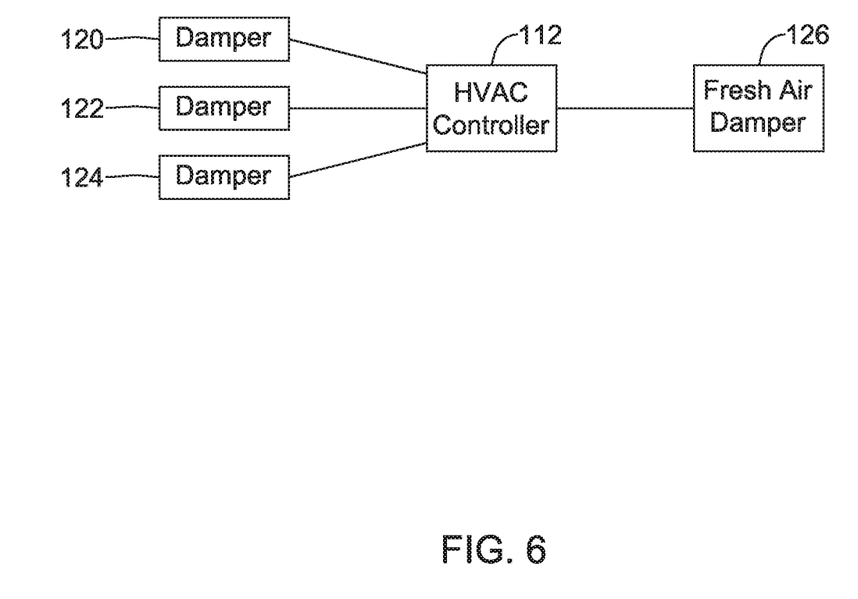
FIG. 6 is a schematic view of a portion of an illustrative forced air system.

In some cases, the HVAC controller 112 may control one or more dampers. FIG. 6 shows the HVAC controller 112 operably coupled with a damper 120, a damper 122 and a damper 124. It will be appreciated that one or more of the dampers 120, 122, 124 may be disposed within the supply air duct 80 or within one or more branch ducts extending from the supply air duct 80. The HVAC controller 112 may open or close, or partially open or partially close, one or more of the dampers 120, 122, 124 in order to raise or lower an air temperature of at least part of the building space 70 (FIG. 2) in accordance with a temperature setpoint or an array of setpoints that are specific to individual rooms 72a, 72b or 72c (FIG. 2). In some cases, the HVAC system 96 may include a fresh air damper 126. The HVAC controller 112 may be configured to open or close, or partially open or partially close, the fresh air damper 126 in response to information received from the remote wireless sensor 86 and/or the return air sensor 84 (FIG. 3) pertaining to particulate and/or volatile organic compound density. If the air inside the building space 70 has a lower particulate and/or volatile organic compound density than the air outside, the HVAC controller 112 may close the fresh air damper 126 in order to protect the indoor air quality. However, if the air inside the building space 70 has a higher particulate and/or volatile organic compound density than the air outside, the HVAC controller 112 may open the fresh air damper 126 in order to improve the indoor air quality. Indoor and outdoor air temperature, humidity and other parameters may also be taken into account by the HVAC controller 112 when determine whether to open and/or close the fresh air damper 126.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. An HVAC controller for controlling an HVAC system of a building, wherein the HVAC system includes a supply air duct and a return air duct, the HVAC controller comprising:
   a communication module for wirelessly communicating with a mobile wireless device that provides a user interface for interacting with the HVAC controller;
   the communication module also for wirelessly receiving a sensed parameter from a remote wireless sensor that is separate from a thermostat and that is located in a living space of the building;
   a wired input for receiving a signal from a return air sensor that is capable of sensing a return air parameter of the air passing through the return air duct of the HVAC system;
   a controller operatively coupled to the communication module, the controller configured to:
     control the HVAC system based at least in part on the sensed parameter from the remote wireless sensor when the communication module is able to wirelessly receive the sensed parameter from the remote wireless sensor; and
     control the HVAC system based at least in part on the return air parameter when the communication module is not able to wirelessly receive the sensed parameter from the remote wireless sensor.

2. The HVAC controller of claim 1, wherein the sensed parameter from the remote wireless sensor is temperature and the return air parameter is also temperature.

3. The HVAC controller of claim 1, wherein the mobile wireless device comprises one of a smartphone and a tablet.

4. The HVAC controller of claim 1 wherein the controller is also configured to communicate with a local user interface via a wired connection.

5. The HVAC controller of claim 4, wherein the controller controls the HVAC system based at least in part on at least one setpoint, and wherein the local user interface is configured to allow a user to change at least one of the at least one setpoint of the controller.

6. The HVAC controller of claim 1, wherein the HVAC system includes a furnace having a furnace housing, and wherein the controller is implemented on a furnace control board located in the furnace housing.

7. The HVAC system of claim 6, wherein the HVAC system comprises:
   a gas valve for providing gas to a burner that is thermally coupled to a heat exchanger;
   a blower fan for drawing air from the return air duct, and providing the air across the heat exchanger and back to the living space of the building via the supply air duct; and
   wherein the furnace control board is further configured to directly control the gas valve and the blower fan of the HVAC system.

8. The HVAC controller of claim 1, wherein the communication module is configured to communicate using one or more of Wi-Fi, IrDA, IEEE 802.15.4, ZigBee, Bluetooth, dedicated short range communication (DSRC), EnOcean, and GSM or LTE cellular communication.

9. The HVAC controller of claim 1, wherein the controller is further configured to:
   determine and store an offset between the sensed parameter and the return air parameter when the communication module is able to wirelessly receive the sensed parameter from the remote wireless sensor; and
   control the HVAC system based at least in part on the return air parameter and the stored offset when the communication module is not able to wirelessly receive the sensed parameter from the remote wireless sensor.

10. The HVAC controller of claim 1, wherein the communication module is also for receiving a measure of outside air temperature, and the controller is configured to:
determine an offset function of a determined offset between the sensed parameter and the return air parameter over outdoor air temperature when the communication module is able to wirelessly receive the sensed parameter from the remote wireless sensor; and
control the HVAC system based at least in part on the return air parameter, the measure of outside air temperature and the offset function when the communication module is not able to wirelessly receive the sensed parameter from the remote wireless sensor.

11. The HVAC controller of claim 1, wherein the HVAC system includes one or more dampers, and when controlling the HVAC system, the controller is configured to control the one or more dampers via the communication module.

12. The HVAC controller of claim 1, wherein the sensed parameter and the return air parameter include one or more of temperature, particulate density, volatile organic compound density, and humidity.

13. The HVAC controller of claim 1, wherein the HVAC system includes a fresh air damper and at least one of the sensed parameter and the return air parameter comprise particulate density, and wherein the controller is configured to control the fresh air damper based at least in part on particulate density.

14. A forced air furnace comprising:
a furnace housing;
the furnace housing coupled to a return air duct for receiving return air from a living space of a building and a supply duct for providing conditioned air to the living space of the building;
a burner situated inside of the furnace housing;
a heat exchanger situated inside of the furnace housing and thermally coupled to the burner;
a blower situated inside of the furnace housing for providing air across the heat exchanger;
a gas valve for providing gas to the burner; and
a controller situated inside of the furnace housing and operatively coupled to the gas valve and the blower, the controller including an input for receiving a temperature value from a remote temperature sensor that is separate from a thermostat and that is located within the living space of the building as well as for receiving a temperature sensor value from a return air temperature sensor that is for detecting a measure related to temperature of the return air in the return air duct, the controller configured to control the gas valve and the blower based at least in part on the received temperature value and a stored temperature setpoint when the controller input receives the temperature value from the remote temperature sensor and the controller is configured to control the gas valve and the blower based at least in part on the temperature sensor value received from the return air temperature sensor when the temperature sensor value is not received from the remote temperature sensor.

15. The forced air furnace of claim 14, wherein the controller is configured to control the gas valve and blower in an attempt to keep the received temperature value within a predetermined dead band of the stored temperature setpoint.

16. The forced air furnace of claim 14, wherein the input is further configured to wirelessly communicate with a mobile wireless device that provides a user interface for interacting with the controller.

17. The forced air furnace of claim 14, wherein the input is further configured to communicate with a wired local user interface, wherein the wired local user interface is configured to allow a user to change the stored temperature setpoint.

18. An HVAC controller for controlling an HVAC system of a building, wherein the HVAC system includes a supply air duct and a return air duct, the HVAC controller comprising:
a communication module for wirelessly receiving a sensed temperature from a remote wireless sensor that is separate from a thermostat and that is located in a living space of the building;
the communication module also configured to receive a wired connection to a return air sensor configured to detect a return air temperature of the air in the return air duct;
a controller operatively coupled to the communication module, the controller configured to:
control the HVAC system based at least in part on the sensed temperature from the remote wireless sensor when the communication module receives the sensed temperature from the remote wireless sensor;
control the HVAC system based at least in part on the return air temperature when the communication module does not receive the sensed temperature from the remote wireless sensor; and
the communication module is also configured to receive a wired connection to a local user interface for changing a setpoint of the controller.

19. The HVAC controller of claim 18, wherein the controller controls the HVAC system based at least in part on the return air temperature and the setpoint when the sensed temperature from the remote wireless sensor is not available.

* * * * *